United States Patent [19]

Hirvonen et al.

[11] Patent Number: 4,528,208

[45] Date of Patent: Jul. 9, 1985

[54] METHOD AND APPARATUS FOR CONTROLLING ARTICLE TEMPERATURE DURING TREATMENT IN VACUUM

[75] Inventors: James K. Hirvonen; Andrew B. Wittkower, both of Rockport, Mass.; A. Stuart Denholm, Sherman, Conn.

[73] Assignee: Zymet, Inc., Danvers, Mass.

[21] Appl. No.: 541,559

[22] Filed: Oct. 13, 1983

[51] Int. Cl.³ ............................................. B05C 13/00
[52] U.S. Cl. ...................................... 427/35; 118/500; 165/104.17; 165/185; 165/DIG. 4; 269/7
[58] Field of Search .................. 118/500; 165/104.17, 165/185, DIG. 4, 2; 269/7; 427/35, 38

[56] References Cited

U.S. PATENT DOCUMENTS

| | | | |
|---|---|---|---|
| 995,537 | 6/1911 | Hertner et al. | 269/7 |
| 3,013,104 | 12/1961 | Young | 165/DIG. 4 |
| 3,079,516 | 2/1963 | Fisher | 165/DIG. 4 |
| 3,137,184 | 6/1964 | Meyers | 165/DIG. 4 |
| 3,215,194 | 11/1965 | Sununu et al. | 165/DIG. 4 |
| 3,294,661 | 12/1966 | Maissel | 118/500 |
| 3,790,152 | 2/1974 | Parsons | 269/7 |
| 3,850,721 | 11/1974 | Schubert | 156/155 |
| 3,897,335 | 7/1975 | Lapac et al. | 264/268 |
| 3,899,379 | 8/1975 | Wanesky | 156/80 |
| 4,005,635 | 2/1977 | Feldcamp | 90/11 C |
| 4,057,101 | 11/1977 | Ruka et al. | 165/DIG. 4 |
| 4,132,689 | 1/1979 | Speyer | 260/23 R |
| 4,139,051 | 2/1979 | Jones et al. | 165/1 |
| 4,193,445 | 3/1980 | Chu et al. | 165/185 |
| 4,228,358 | 10/1980 | Ryding | 250/457 |
| 4,403,567 | 9/1983 | da Costa et al. | 118/500 |

OTHER PUBLICATIONS

Dearnaley et al., *Ion Implantation* North-Holland Publishing Co., London (1973), pp. 421-427.

Primary Examiner—John H. Newsome

[57] ABSTRACT

A method of controlling the temperature of an article comprised of predetermined material during treatment of the article in vacuum comprises providing a heat conductive substance having a solid, rigid state at the temperature of the treatment, having a molten state at a higher temperature below the minimum damage temperature of the article, and being chemically nonreactive, nonwetting and nonadhesive at the higher temperature with a first portion of the article. The first portion of the article to be treated is immersed in molten heat conductive substance, a second portion of the article to be treated remaining unimmersed, exposed for treatment, and the substance is caused to solidify about the immersed first portion. The solid heat conductive substance is maintained in heat conductive relationship with a temperature control surface, and the exposed second portion of the article is treated in vacuum while the temperature of the surface and thereby, via the heat conductive substance, the temperature of the article is controlled during treatment. Thereafter, following treatment, the heat conductive substance is reheated to cause the substance to be in molten state, and the treated article is removed. In one aspect, the method involves controlling the temperature of an article during treatment with ion beams under vacuum of pressure of the order of $10^{-5}$ torr. Apparatus is also described.

25 Claims, 6 Drawing Figures

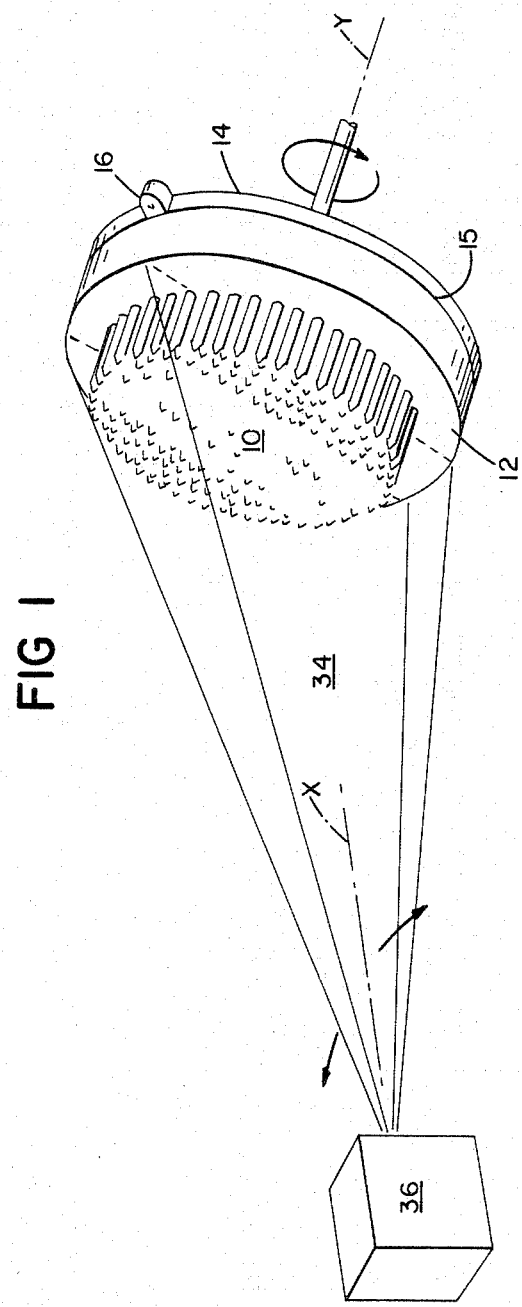
FIG 1
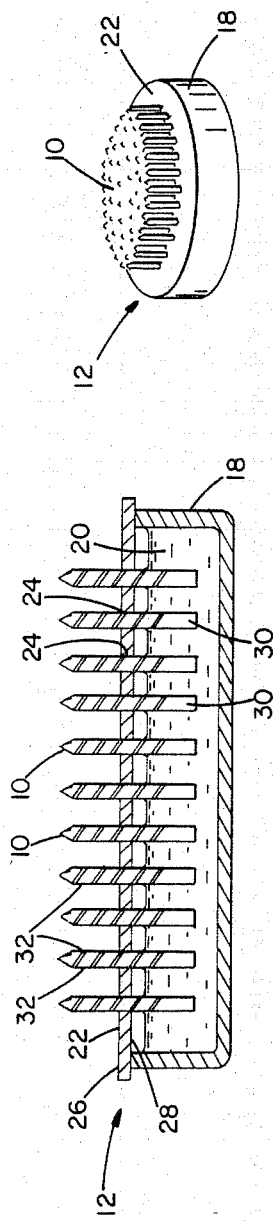
FIG 1b
FIG 1a

METHOD AND APPARATUS FOR CONTROLLING ARTICLE TEMPERATURE DURING TREATMENT IN VACUUM

BACKGROUND OF THE INVENTION

The invention relates to controlling the temperature of an article during treatment in vacuum.

Certain treatment processes must be carried out in a vacuum environment, e.g. treatment by ion or other particle beams in which the particles would be hindered by presence of gas molecules, etc. in the beam path.

Heat transfer between surfaces in a vacuum occurs primarily by radiation. This is true even of surfaces that appear to be in contact, because, in actual fact, due to surface irregularities, only point to point contact occurs, even between mirror polished surfaces. Without gas molecules to bridge the gaps between actual points of contact, heat transfer by other means, e.g. by conduction, generally cannot occur. In a number of processes, heat transfer by radiation is not sufficient, e.g. in high energy beam systems, heat conduction from the article is necessary to avoid damage to the article. In other processes, a certain minimum article temperature is required prior to treatment.

Means have been proposed in the prior art for improving the conductivity in a vacuum between the article to be treated and an adjacent temperature control surface. These means have included: vacuum grease, deformable plastic, and an interfacial gas layer, among others, but none are suited to many situations, e.g., due to the nature of the article to be treated.

SUMMARY OF THE INVENTION

According to the invention, a method of controlling the temperature of an article comprised of predetermined material during treatment of the article in vacuum comprises providing a heat conductive substance having a solid, rigid state at the temperature of treatment, having a molten state at a higher temperature below the minimum damage temperature of the article, and being chemically nonreactive, nonwetting and nonadhesive at the highest temperature with a first portion of the article, heating the heat conductive substance to the higher temperature to cause the substance to be in molten state, immersing the first portion of the article to be treated in the molten heat conductive substance, a second portion of the article to be treated remaining unimmersed, exposed for treatment, cooling the heat conductive substance to cause it to solidify about the immersed first portion of the article, maintaining the solid heat conductive substance in heat conductive relationship with a temperature control surface, subjecting the exposed portion of the article to treatment in vacuum, controlling the temperature of the temperature control surface and thereby, via the heat conductive substance, controlling the temperature of the article during treatment, and, thereafter, following treatment, reheating the heat conductive substance to the higher temperature to cause the substance to be in molten state, and removing the treated article from the molten heat conductive substance.

According to another aspect of the invention, the method concerns treatment of an article with ion beams, the article being of predetermined material, the temperature of the article being controlled during treatment in vacuum of pressure of the order of about $10^{-5}$ torr.

In preferred embodiments of both aspects of the invention, the vapor pressure of the heat conductive substance at the temperature of treatment is of the order of less than $10^{-7}$ torr, preferably of the order of $10^{-10}$ torr or less; the rate of heat conductivity of the heat conductive substance is of the order of 0.04 watt/cm°C. or more, preferably of the order of about 0.2 watts/cm°C.; the method further comprises: covering the heat conductive substance with a cover having defined therethrough at least one aperture adapted for passage of the first portion of the article therethrough for immersion in the heat conductive substance; providing in the heat conductive substance a heat conductive element having a melting point and rate of heat conductivity significantly higher than that of the heat conductive substance, whereby, during treatment, the rate of heat conductivity between article and temperature control surface is greater than the rate of heat conductivity of the heat conductive substance by itself; the predetermined material is metal selected from the group consisting of tungsten carbide and tool steel, the ions in the treatment beam being nitrogen, whereby the treated article has increased strength in the treated second portion; the heat conductive substance is a substantial eutectic mixture of a plurality of components; the heat conductive substance is a metal alloy; and the method further comprises applying a magnetic field through the heat conductive substance to draw the first portion of the article through the heat conductive substance in molten state into fixed position prior to causing the substance to solidify about the first portion.

According to a further aspect of the invention, an apparatus for controlling the temperature of an article comprised of predetermined material during treatment of the article in vacuum is provided.

In further preferred embodiments of the invention, the temperature control surface comprises a member for supporting the article during treatment in the vacuum, preferably the apparatus is adapted to provide relative motion between a treatment beam and article, more preferably the support surface with the article disposed thereupon is adapted for rotation, still more preferably the axis of rotation of the support lies at an angle to the axis of the beam.

It is an objective of this invention to provide a method of controlling the temperature of an article during treatment of the article in vacuum, particularly for articles where the temperature may not be adequately controlled by prior known methods.

It is a further object to provide a universal, heat-conductive chuck capable of holding articles of varied configuration in heat conductive relationship with a temperature control surface during treatment.

PREFERRED EMBODIMENT OF THE INVENTION

We first briefly describe the drawings.

Drawings

FIG. 1 is a perspective view of the treatment of articles according to the invention;

FIG. 1a is a side section view of articles to be treated maintained in heat conductive relationship by use of a heat conductive substance according to the invention, while FIG. 1b is an perspective view of the tray of FIG. 1a;

STRUCTURE

Figure 2:
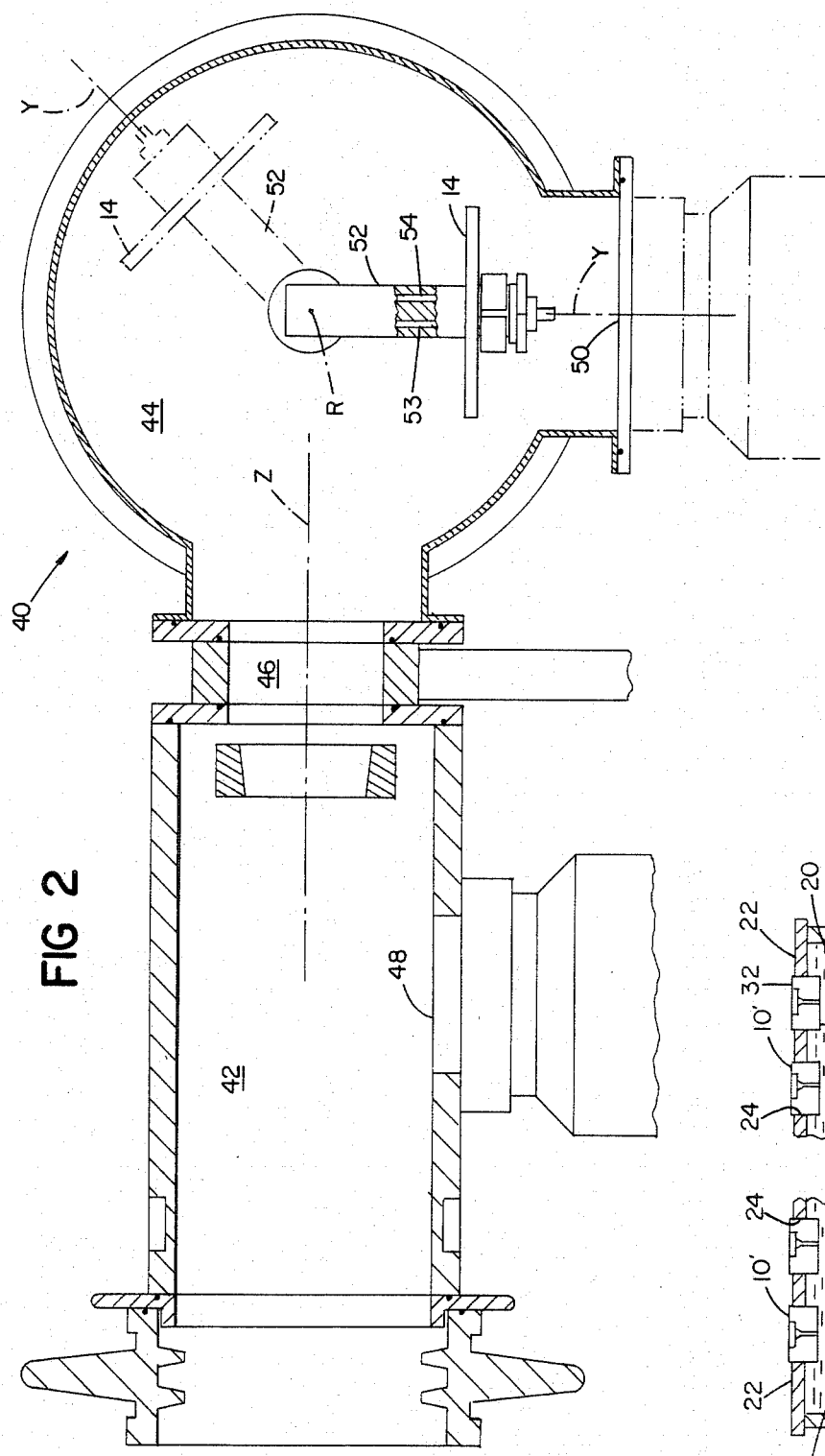
FIG. 2 is a side section view of a vacuum beam treatment apparatus useful according to the invention.

Referring to FIG. 1 treatment of articles in vacuum with control of article temperature according to the invention is shown. In the figure, articles 10, e.g. printed circuit board drills are shown, are disposed in tray 12 held on support 14 by means of clamps 16 (only one is shown). Referring to FIG. 1a, tray 12 is comprised of pan 18 which is nearly filled with a heat conductive substance 20.

Heat conductive substance 20 is carefully selected for its desirable qualities useful according to the invention. The substance is selected to have a melting point temperature below the minimum temperature at which temperature damage of the article can occur, and is selected to remain in solid rigid state at the temperature at which treatment of the article is achieved. The substance is also selected for nonchemical reactivity with the material of the article and for substantial nonwettability and nonadhesiveness substantially with the article portion of with which it comes into contact at the temperatures to which it is to be subjected to substantially avoid an unnecessary cleaning step. In one preferred embodiment, where the articles are of tungsten carbide, e.g. drills 10, a eutectic metal alloy having a relatively low melting point is employed, e.g. one preferred alloy is 55 wt% bismuth and 45 wt% lead, having a melting point of 124° C. It is also preferred that the substance employed have a vapor pressure of the order of less than about $10^{-7}$ torr, and preferably of the order of about $10^{-10}$ torr or less, to minimize the level of potentially contaminating particles released under vacuum, and a rate of heat conductivity of at least 0.04 watt/cm°C., and preferably of the order of about 0.2 watt/cm°C., to provide an adequate heat transfer rate and to maintain the bulk temperature of heat conductive substance 20 sufficiently below its melting point. Examples of other suitable metals useful in alloys include tin and indium.

Cover 22, which fits closely on pan 18, has a multiplicity of apertures 24 defined through the surfaces 26, 28 which allow lower portions 30 of articles 10 to extend through cover 22 to be immersed in conductive material 20, while the upper portions 32 of the articles remain exposed for treatment.

Support 14 is adapted for rotation about axis Y, which lies at an angle to the axis X of the ion beam 34 emitting from source 36, e.g. a Freeman Source manufactured by Eaton Semi-Conductor Implantation Corporation of Beverly, Mass., with an accelerator manufactured by Zymet, Inc. of Danvers, Mass. In the embodiment shown, the beam is rectangular and is scanned across the articles during treatment.

Referring to FIG. 2, an apparatus 40 for treatment of the articles 10 according to the invention is shown. Treatment beam 34 is directed along beam bath 42 to enter treatment chamber 44, also under vacuum, e.g. at pressure of the order of about $10^{-5}$ torr or less, through port 46. The vacuum environment is maintained by vacuum pumps (not shown) drawing through ports 48, 50.

Positioned within treatment chamber 44 is support 14 suspended from radial arm 52. Arm 52 is adapted to rotate about axis R to be selectively positioned within chamber 44 to dispose support 14 at a selected angle to the centerline Z of beam 34. As an example, in FIG. 2, support 14 is shown at 0° to centerline Z and in dashed line rotated approximately 135° to a position of approximately 45° to the beam centerline Z. Further relative motion between the articles and the beam is provided by rotation of support 14 on axis Y, and transverse scanning motion of beam 34, shown in FIG. 1.

OPERATION

Referring again to FIGS. 1, 1a, and 1b, pan 18 containing heat conductive substance 20 is subjected to heating to above the melting point of substance 20, e.g., using a lead/bismuth alloy (45 wt.%/55 wt.%, respectively), about 124° C., to change substance 20 into a molten state.

The lower portions 30 of articles 10, e.g. printed circuit board drills of tungsten carbide, are inserted through correspondingly sized apertures 24 in cover 22 to be immersed in substance 20. Upper portions 32 of drills 10 remain exposed above the surface 26 of cover 22 for treatment, as will be described below.

Only the upper portion 32 of drill 10 exposed above cover surface 26 is subjected to beam treatment and thus to heating, so the thermal load that must be transferred by substance 20 from articles 10 to pan 18 can be somewhat limited by selective positioning of the articles relative to cover surface 26. The cover also prevents the ions in beam 34 from striking the surface of substance 20 which could cause undesirable splattering of substance 20 molecules onto surfaces 10.

Heating is stopped, and substance 20 is allowed to solidify about submerged end portions 30 of drills 10. The close fitting relationship of cover 22 about drills 10 assists in maintaining the positioning of the drills during solidification. Also, where the specific gravity and surface tension of substance 20 in molten state relative to the nature of the articles tends to buoy the articles up, tight fitting apertures 24 can assist in holding the lower portions 30 of articles 10 properly immersed until the substance 20 has solidified about portions 30. As substance 20 solidifies, the drills are fixed in close heat conductive relationship with heat conductive substance 20, which, of course, is also in heat conductive relationship with pan 18, typically of aluminum. (Where the alloy employed includes sufficient busmuth, typically more than 50 wt.%, the substance has the additional advantageous characteristic of expanding as it solidifies to further improve the contact between article 10, substance 20 and pan 18.)

Referring to FIG. 2, tray 12 is placed upon support 14 in treatment chamber 44 of vacuum treatment apparatus 40 and clamps 16 are applied to fix tray 12 on support 14 and also improve the heat conductive relationship between pan 18 and support 14.

Support 14 serves as a temperature control surface as heat transfer fluid is circulated via conduits 53, 54 through arm 52 to support 14. The temperature of the transfer fluid is controlled externally to selectively add or remove heat from the system, and thereby, via the heat conductive relationship provided by substance 20, to or from articles 10 being treated.

Radial arm 52 is positioned about axis R for the desired angular relationship with beam centerline Z and slow rotation of support 14 on axis Y is initiated to allow proper treatment coverage. Vacuum apparatus 40 is sealed and the interior is evacuated by pumping via ports 48, 50 to the required vacuum environment, typically to a pressure of about $10^{-5}$ torr. Beam 34 is intiated along beam centerline Z. In the embodiment described, articles 10 are arranged in a pattern having a diameter of about 8 inches, and beam 34 is a rectangle about 1 inch by 8 inches at the target. Beam 34 is scanned transversely to centerline Z to provide effective coverage of an 8 inch by 8 inch area.

In the case of articles of tungsten carbide being treated by ion implantation for hardening and to improve wear resistance, the beam is typically nitrogen ions and is a 100 kilovolt beam at 10 milliamps (about 1000 watts).

The power of the beam increases the temperature of the exposed portions 32 of drills 10. This heat is conducted through the drills to the lower portions 30 and, by means of the heat conductive relationship established by the heat conductive substance 20 between the drills 10 and the pan 18, the heat is conducted to the pan 18 and then to support 14 which is cooled by flow of the heat transfer fluid through conduits 53, 54.

When treatment is complete, typically after about 1 hour, beam source 36 is shut off, acuum apparatus 40 is returned to atmospheric pressure and tray 12 is removed from treatment chamber 44. Substance 20 is heated again to above its melting point temperature and treated articles 10 are removed, and new articles to be treated are loaded into tray 12 to repeat the process. (Typically two trays would be used alternately for most efficient use of apparatus 40.)

OTHER EMBODIMENTS

Figure 3:
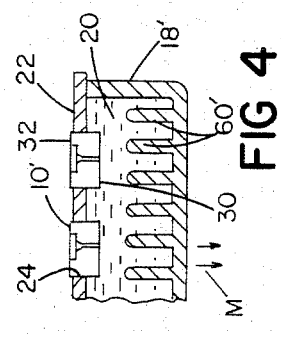
FIGS. 3 and 4 are side section views showing use of other heat conductive substances according to the invention.
Figure 4:
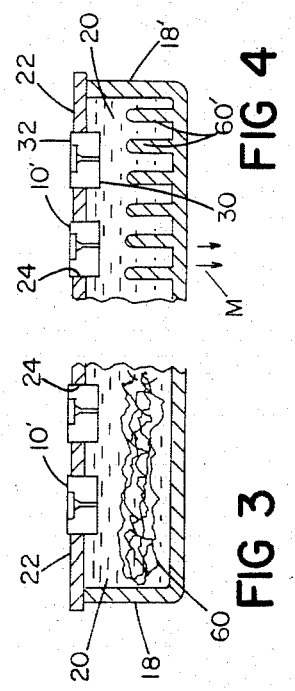

Other embodiments are within the following claims. For example, the method and apparatus described are useful for a variety of treatment processes conducted in vacuum where article temperature control is desirable. Also, heat conductive substance 20 may be any material, e.g. including organic materials, having sufficiently low vapor pressure, and the effective heat conductivity of substance 20 may be increased by including heat conductive elements therein, e.g. referring to FIGS. 3 and 4, heat conductive elements 60, 60' having a much higher melting point and higher conductivity than substance 20 may also be included in pan 18 to improve the rate of heat conduction between articles 10', as an example wire drawing dies made from tool steel are shown, and pan 18. In the drawings, 60 (FIG. 3) is a porous element, which may be held in position, e.g. by a screen while 60' (FIG. 4) is a series of fin elements. Both forms are typically placed in positive contact with tray 18 to ensure good heat conductivity. Metallic or other conductive powder, strips, or beads may also be provided in the primary heat conductive substance. The heat conductive elements may also take the form of a grid, which in certain circumstances may aid in positioning or holding articles while the substance is in molten state. Where smaller articles are treated or lower power beams employed, support 14 may be merely a heat sink without circulating heat transfer fluid, and, of course, heat transfer fluid of higher temperature may be used where it is desired to increase the temperature of articles 10. To improve the surface-to-surface contact between pan 18 and support 14, a deformable surface, e.g. conductive rubber or metal foil 15 may be employed; and tray 14 may be comprised of two or more cavities, each filled with heat conductive substance 20, or may be a grid of grooves, with article positioned at the intersections. Also, as shown in FIG. 4, a magnetic force M may be employed beneath pan 18 to draw the lower portions 30' of articles 10' down into substance 20 and to hold the articles fixed prior to solidification of substance 20. Cover 22 may not be used in all situations.

We claim:

1. A method of controlling the temperature of an article, the shape of which may vary, while exposing a selected portion of it to treatment under vacuum by an energetic beam, said method comprising providing, within a container, a heat conductive substance of selected depth having a solid rigid state under conditions of said treatment and having a molten state at a higher temperature below the minimum damage temperature of said article, said substance being chemically nonreactive, nonwetting and nonadhesive at said higher temperature with a first portion of said article, heating said heat conductive substance to said higher temperature to cause said substance to be in molten state, temporarily holding said article in selected position to submerge said first portion of said article substantially below the surface of said molten heat conductive substance while a second portion of said article to be treated protrudes above said surface, cooling said heat conductive substance to cause it to solidify about said immersed first portion of said article in intimate heat conducting and rigid supporting relationship therewith, with said second portion of said articles protruding above said surface, in position for exposure to said beam, subjecting said exposed second portion under vacuum to said energetic beam for said treatment while controlling the temperature of said article by heat transfer via said intimately engaged, rigid supporting substance, and, thereafter following said treatment, reheating said rigid substance to said higher temperature to cause said substance to be in molten state, and removing the treated article therefrom.

2. A method of controlling the temperature of an article, the shape of which may vary, while exposing a selected portion of it to treatment by an energetic ion beam in vacuum of pressure of the order of $10^{-5}$ torr, said method comprising providing, within a container, a heat conductive substance of selected depth having a solid rigid state under conditions of said treatment and having a molten state at a higher temperature below the minimum damage temperature of said article, said substance being chemically nonreactive, nonwetting and nonadhesive at said higher temperature with a first portion of said article, heating said heat conductive substance to said higher temperature to cause said substance to be in molten state, temporarily holding said article in selected position to submerge said first portion of said article substantially below the surface of said molten heat conductive substance while a second portion of said article to be treated protrudes above said surface, cooling said heat conductive substance to cause it to solidify about said immersed first portion of said article in intimate heat conducting and rigid supporting relationship therewith, with said second portion of said article protruding above said surface, in position for exposure to said beam, disposing said rigidily held article in the path of said energetic beam, with the surface of said rigid heat conductive substance lying at an angle to the axis of said beam, subjecting said exposed second portion of said article to said energetic ion beam for said treatment while rotating said rigidly held article about an axis of rotation disposed at an angle to said beam and controlling the temperature of said article by heat transfer via said intimately engaged, rigid supporting heat conductive substance, and, thereafter, following said treatment, reheating said rigid substance to said higher temperature to cause said substance to be in molten state, and removing the treated article therefrom.

3. The method of claim 1 or 2 wherein
the vapor pressure of said heat conductive substance at the temperature of said treatment is of the order of less than $10^{-7}$ torr.

4. The method of claim 3 wherein
said vapor pressure is of the order of $10^{-10}$ torr or less.

5. The method of claim 1 or 2 wherein
the rate of heat conductivity of said heat conductive substance is of the order of 0.04 watt/cm°C. or more.

6. The method of claim 5 wherein
said rate of heat conductivity is of the order of about 0.2 watts/cm°C.

7. The method of claim 1 or 2 further comprising covering said heat conductive substance with a cover having defined therethrough at least one aperture adapted for passage of said first portion of said article therethrough for immersion in said heat conductive substance.

8. The method of claim 1 or 2 further comprising providing in said heat conductive substance a heat conductive element having a melting point and rate of heat conductivity significantly higher than that of said heat conductive substance, whereby, during said treatment, the rate of heat conductivity between said article and said temperature control surface is greater than the rate of heat conductivity of said heat conductive substance by itself.

9. The method of claim 1 or 2 wherein said predetermined material is metal selected from the group consisting of tungsten carbide and tool steel,
the ions in the treatment beam being nitrogen,
whereby the treated article has increased strength in said treated second portion.

10. The method of claim 1 or 2 wherein said heat conductive substance is a substantial eutectic mixture of a plurality of components.

11. The method of claim 1 or 2 wherein said heat conductive substance is a metal alloy.

12. A method of controlling the temperature of an article comprised of predetermined material during treatment in vacuum of said article with an energetic beam,
said method comprising
providing a heat conductive substance having a solid, rigid state under conditions of said treatment, and having a molten state at a higher temperature below the minimum damage temperature of said article, and being chemically nonreactive, nonwetting and nonadhesive at said higher temperature with a first portion of said article, heating said heat conductive substance to said higher temperature to cause said substance to be in molten state, immersing said first portion of said article into said molten heat conductive substance, a second portion of said article to be treated remaining unimmersed, exposed for said treatment, by applying a magnetic field through said heat conductive substance to draw said first portion of said article through said heat conductive substance in molten state into fixed position, cooling said heat conductive substance to cause it to solidify about said immersed first portion of said article to hold said article for said treatment, subjecting said exposed second portion of said article to an energetic beam for said treatment in vacuum, controlling the temperature of said temperature control surface and thereby, via said heat conductive substance, controlling the temperature of said article during said treatment, and, thereafter, following said treatment, reheating said heat conductive substance to said higher temperature to cause said substance to be in molten state, and removing the treated article from said molten heat conductive substance.

13. An apparatus for controlling the temperature of an article, the shape of which may vary, while a portion of said article is exposed to a predetermined treatment by an ion energetic beam,
said apparatus comprising:
a container, and
within said container, a heat conductive substance of selected depth having a solid, rigid state under the conditions of said treatment and having a molten state at the temperature below the minimum damage temperature of said article, said substance being chemically nonreactive, nonwetting and nonadhesive at said higher temperature with a first, support portion of said article, said contained substance being adapted, in molten state to submersibly receive said first support portion of said article substantially below the surface of said molten heat conductive substance while leaving a second portion of said article to be treated exposed above said surface in selected position, said substance being further adapted, upon cooling, to solidify about said immersed first, support portion of said article in intimate heat conducting and rigid supporting relationship therewith, with said second portion of said article protruding above said surface, in selected position for exposure to said beam, whereby, said rigid heat conductive substance permits control of the temperature and accurate angular positioning of said article during treatment with said energetic ion beam in vacuum.

14. The apparatus of claim 13 wherein
the vapor pressure of said heat conductive substance at the temperature of treatment is of the order of less than $10^{-7}$ torr.

15. The apparatus of claim 14 wherein
said vapor pressure is of the order of $10^{-10}$ torr or less.

16. The apparatus of claim 13 wherein
the rate of conductivity of said heat conductive substance is of the order of 0.04 watt/cm°C. or more.

17. The apparatus of claim 16 wherein
said rate of conductivity is of the order of about 0.2 watts/cm°C.

18. The apparatus of claim 13 wherein said temperature control surface comprises a member for supporting said article during treatment in said vacuum.

19. The apparatus of claim 18 wherein said apparatus is adapted to provide relative motion between a treatment beam and said article.

20. The apparatus of claim 19 wherein said support surface with said article disposed thereupon is adapted for rotation.

21. The apparatus of claim 20 wherein the axis of rotation of said support lies at an angle to the axis of said beam.

22. The apparatus of claim 13 wherein said apparatus further comprises a cover having defined therethrough at least one aperture adapted for passage of a portion of said article therethrough for immersion in said heat conductive substance.

23. The apparatus of claim 13 wherein said apparatus further comprises a heat conductive element provided in said heat conductive substance,
said heat conductive element having a melting point and rate of heat conductivity significantly higher than said heat conductive substance,
whereby, during said treatment, the rate of heat conductivity between said article and said temperature control surface is greater than the rate of heat conductivity of said heat conductive substance by itself.

24. The apparatus of claim 13 wherein said heat conductive substance is a substantial eutectic mixture of a plurality of components.

25. The apparatus of claim 13 wherein said heat conductive substance is a metal alloy.

* * * * *

UNITED STATES PATENT AND TRADEMARK OFFICE
CERTIFICATE OF CORRECTION

PATENT NO. : 4,528,208
DATED : July 9, 1985
INVENTOR(S) : METHOD AND APPARATUS FOR CONTROLLING ARTICLE TEMPERATURE DURING TREATMENT IN VACUUM It is certified that error appears in the above-identified patent and that said Letters Patent are hereby corrected as shown below:

Col. 1, line 31, "to" should be --in--.

Col. 4, line 45, "busmuth" should be --bismuth--.

Col. 4, line 68, "in-" should be deleted.

Col. 5, line 1, "tiated" should be --initiated--.
line 21, "vacuum" is misspelled.

Signed and Sealed this

Twenty-ninth Day of July 1986

[SEAL]

Attest:

Attesting Officer

DONALD J. QUIGG

Commissioner of Patents and Trademarks